United States Patent
Kyo et al.

(10) Patent No.: US 11,256,543 B2
(45) Date of Patent: Feb. 22, 2022

(54) PROCESSOR AND INSTRUCTION SCHEDULING METHOD

(71) Applicant: Huawei Technologies Co., Ltd., Shenzhen (CN)

(72) Inventors: Shorin Kyo, Shenzhen (CN); Ye Gao, Shenzhen (CN); Shinri Inamori, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 16/577,092

(22) Filed: Sep. 20, 2019

(65) Prior Publication Data

US 2020/0012524 A1 Jan. 9, 2020

Related U.S. Application Data

(63) Continuation of application No. PCT/CN2018/073200, filed on Jan. 18, 2018.

(30) Foreign Application Priority Data

Mar. 21, 2017 (CN) .......................... 201710169572.6

(51) Int. Cl.
*G06F 9/34* (2018.01)
*G06F 9/46* (2006.01)
(Continued)

(52) U.S. Cl.
CPC .......... *G06F 9/4881* (2013.01); *G06F 9/3009* (2013.01); *G06F 9/30145* (2013.01);
(Continued)

(58) Field of Classification Search
CPC .. G06F 9/4881; G06F 9/3009; G06F 9/30145; G06F 9/3818; G06F 9/3895; G06F 9/325; G06F 9/3825; G06F 9/4846
(Continued)

(56) References Cited

U.S. PATENT DOCUMENTS 6,311,204 B1 * 10/2001 Mills .......................... G06F 9/52
345/502
8,074,051 B2 12/2011 Hokenek et al.
(Continued)

FOREIGN PATENT DOCUMENTS

CN 1985242 A 6/2007
CN 101171570 A 4/2008
(Continued)

OTHER PUBLICATIONS

Wo2018/171319A1, Sep. 27, 2018 (Year: 2018).*
(Continued)

*Primary Examiner* — Daniel H Pan
(74) *Attorney, Agent, or Firm* — Conley Rose, P.C.

(57) ABSTRACT

A processor and an instruction scheduling method for X-channel interleaved multi-threading, where X is an integer greater than one. The processor includes a decoding unit and a processing unit. The decoding unit is configured to obtain one instruction from each of Z predefined threads in each cyclic period, decode the Z obtained instructions to obtain Z decoding results, and send the Z decoding results to the processing unit, where each cyclic period includes X sending periods, one decoding result is sent to the processing unit in each sending period, a decoding result of the Z decoding results may be repeatedly sent by the decoding unit in a plurality of sending periods, wherein 1≤Z<X or Z=X, and wherein Z is an integer. The processing unit (32) is configured to execute the instruction based on the decoding result.

20 Claims, 13 Drawing Sheets

(51) Int. Cl.
*G06F 9/48* (2006.01)
*G06F 9/30* (2018.01)
*G06F 9/38* (2018.01)
*G06F 9/32* (2018.01)

(52) U.S. Cl.
CPC .......... *G06F 9/3818* (2013.01); *G06F 9/3895* (2013.01); *G06F 9/325* (2013.01)

(58) Field of Classification Search
USPC .................. 718/102–108; 712/208, 213, 245
See application file for complete search history.

(56) References Cited

U.S. PATENT DOCUMENTS

| | | | |
|---|---|---|---|
| 8,195,921 B2 | 6/2012 | Golla et al. | |
| 8,429,384 B2 | 4/2013 | Pennock et al. | |
| 2006/0020841 A1* | 1/2006 | Fisher | G06F 9/3851 713/400 |
| 2006/0206902 A1 | 9/2006 | Jamil et al. | |
| 2006/0212681 A1* | 9/2006 | Codrescu | G06F 9/3885 712/214 |
| 2006/0218373 A1 | 9/2006 | Plondke et al. | |
| 2006/0230257 A1 | 10/2006 | Ahmed et al. | |
| 2008/0016321 A1* | 1/2008 | Pennock | G06F 9/3867 712/35 |
| 2008/0040724 A1 | 2/2008 | Kang et al. | |
| 2009/0216993 A1 | 8/2009 | Venkumahanti et al. | |
| 2010/0281234 A1 | 11/2010 | Ahmed et al. | |
| 2012/0216210 A1 | 8/2012 | Armstrong et al. | |
| 2014/0181468 A1* | 6/2014 | Ahmed | G06F 9/3885 712/24 |
| 2015/0220347 A1 | 8/2015 | Glossner et al. | |

FOREIGN PATENT DOCUMENTS

| | | |
|---|---|---|
| CN | 102089742 A | 6/2011 |
| EP | 1890225 A1 | 2/2008 |
| WO | 2006102668 A2 | 9/2006 |
| WO | 2011072083 A1 | 6/2011 |

OTHER PUBLICATIONS

Priority Document CN201710169572.6 (Nov. 23, 2017) (Year: 2017).*

"Barrel processor," From Wikipedia, the free encyclopedia, retrieved from the internet:https://en.wikipedia.org/wiki/Barrel_processor, on Dec. 16, 2019, 3 pages.

Foreign Communication From A Counterpart Application, PCT Application No. PCT/CN2018/073200, English Translation of International Search Report dated Apr. 20, 2018, 4 pages.

Foreign Communication From A Counterpart Application, PCT Application No. PCT/CN2018/073200, English Translation of Written Opinion dated Apr. 20, 2018, 3 pages.

\* cited by examiner

PROCESSOR AND INSTRUCTION SCHEDULING METHOD

CROSS-REFERENCE TO RELATED APPLICATIONS

This application is a continuation application of International Application No. PCT/CN2018/073200, filed on Jan. 18, 2018, which claims priority to Chinese Patent Application No. 201710169572.6, filed on Mar. 21, 2017, both of which are hereby incorporated by reference in their entireties.

TECHNICAL FIELD

This application relates to the field of computer technologies, and in particular, to a processor and an instruction scheduling method.

BACKGROUND

A processor usually accelerates processing using a pipelining technology. If a to-be-executed instruction in a pipeline needs to depend on an execution result of a previous instruction, the instruction cannot be executed immediately before the previous instruction is completed. In this case, a caused conflict may be referred to as a data hazard, and as a result, an instruction processing delay is caused. In another approach, an interleaved multithreading (IMT) technology is used to avoid the instruction processing delay in the pipeline caused by the data hazard.

The IMT technology is an instruction scheduling mechanism using thread level parallelism (TLP). FIG. 1 is a schematic diagram of an instruction scheduling process of a processor that supports four-channel IMT. In other words, a maximum quantity X of threads supported by the processor is 4. The processor includes an instruction decoder and a data path. The instruction decoder is configured to: decode an instruction to obtain a decoding result, and send the decoding result to the data path. The data path is configured to execute the instruction based on the decoding result. As shown in FIG. 1, a PC 0, a PC 1, a PC 2, and a PC 3 respectively represent program counters (PC) of four independent threads. The instruction decoder schedules instructions in the threads in the following sequence: In a/the first time period, a decoding unit obtains the first instruction in a thread corresponding to the PC 0, and decodes the first instruction; in the second time period, the decoding unit obtains the first instruction in a thread corresponding to the PC 1, and decodes the first instruction; in the third time period, the decoding unit obtains the first instruction in a thread corresponding to the PC 2, and decodes the first instruction; in the fourth time period, the decoding unit obtains the first instruction in a thread corresponding to the PC 3, and decodes the first instruction; and then in the fifth time period, the decoding unit returns to the PC 0 again, obtains the second instruction in the thread corresponding to the PC 0, and decodes the second instruction, and so on.

In this way, for two adjacent instructions in a same thread, there is a buffer period of several time periods between the two instructions. For example, for the processor that supports four-channel IMT shown in FIG. 1, there is a buffer period of three time periods between two adjacent instructions in a same thread. When an instruction starts to be executed, a data write back operation has completed on a previous instruction, and therefore no data hazard occurs. In addition, the pipeline is always used by another thread in the buffer period between the two adjacent instructions in the same thread, and therefore high utilization of the pipeline is also maintained.

The existing IMT technology described above may be referred to as a static IMT (S-IMT) technology. The S-IMT technology also has the following technical disadvantages.

When a quantity Z of threads executed by the processor is less than a maximum quantity X of threads supported by the processor, the instruction decoder still cyclically schedules instructions in the X threads according to the foregoing fixed sequence. With reference to FIG. 2, the processor that supports four-channel IMT is still used as an example. When the quantity Z of threads executed by the processor is 2, an instruction scheduling sequence of the instruction decoder is still as described above, and instruction scheduling is cyclically performed in the four threads corresponding to the PC 0, the PC 1, the PC 2, and the PC 3. Because no thread corresponding to the PC 2 and the PC 3 is executed, the instruction decoder does not perform a decoding operation or send a decoding result to the data path in two time periods in each cyclic process, and consequently there is an idle time period in which no instruction is executed in the data path.

Therefore, an existing processor using the S-IMT technology cannot fully utilize a data path when a quantity of threads executed by the processor is less than a maximum quantity of threads supported by the processor, and therefore utilization of the data path is reduced and performance cannot be fully utilized.

SUMMARY

Embodiments of this application provide a processor and an instruction scheduling method in order to resolve a problem that an existing processor using an S-IMT technology cannot fully utilize a data path when a quantity of threads executed by the processor is less than a maximum quantity of threads supported by the processor, and therefore utilization of the data path is reduced and performance cannot be fully utilized.

According to one aspect, a processor is provided, where the processor supports X-channel IMT, the processor includes a decoding unit and a processing unit, and X is an integer greater than 1; the decoding unit is configured to: obtain one instruction from each of Z predefined threads in each cyclic period, decode the Z obtained instructions to obtain Z decoding results, and send the Z decoding results to the processing unit, where each cyclic period includes X sending periods, one decoding result is sent to the processing unit in each sending period, a decoding result of the Z decoding results may be repeatedly sent by the decoding unit in a plurality of sending periods, $1 \leq Z < X$ or $Z = X$, and Z is an integer; and the processing unit is configured to execute the instruction based on the decoding result.

According to the technical solution provided in this embodiment of this application, when a quantity of threads executed by the processor is less than a maximum quantity of threads supported by the processor, the decoding unit repeatedly sends the decoding result to the processing unit in the plurality of sending periods such that the decoding unit sends one decoding result to the processing unit in each sending period. Therefore, there is no idle time period in which no instruction is executed in the processing unit such that the processing unit is fully utilized, high utilization of the processing unit is ensured, and performance of the processing unit can be fully utilized.

In a possible design, the decoding unit includes an instruction decoder and X program counters; and the instruction decoder is configured to: assign k=1, and obtain one instruction from a $j^{th}$ thread of the Z predefined threads based on a value of a $j^{th}$ program counter in an $i^{th}$ sending period of an $n^{th}$ cyclic period, where an initial value of each of n, i, and j is 1, and X is an integer multiple of Z; update the value of the $j^{th}$ program counter, and decode the obtained instruction to obtain a decoding result corresponding to the instruction in the $j^{th}$ thread; send the decoding result corresponding to the instruction in the $j^{th}$ thread to the processing unit; assign i=i+1, and determine whether i is greater than X; and if i is less than or equal to X, assign k=k+1, and determine whether k is greater than X/Z; if k is less than or equal to X/Z, re-perform the process starting from the step of sending the decoding result corresponding to the instruction in the $j^{th}$ thread to the processing unit; or if k is greater than X/Z, assign j=j+1 and k=1, and re-perform the process starting from the step of obtaining one instruction from a $j^{th}$ thread of the Z predefined threads based on a value of a $j^{th}$ program counter in an $i^{th}$ sending period of an $n^{th}$ cyclic period; or if i is greater than X, assign n=n+1, i=1, j=1, and k=1, and re-perform the process starting from the step of obtaining one instruction from a $j^{th}$ thread of the Z predefined threads based on a value of a $j^{th}$ program counter in an $i^{th}$ sending period of an $n^{th}$ cyclic period.

In a possible design, the decoding unit includes an instruction decoder and X program counters; and the instruction decoder is configured to: obtain one instruction from a $j^{th}$ thread of the Z predefined threads based on a value of a $j^{th}$ program counter in an $i^{th}$ sending period of an $n^{th}$ cyclic period, where an initial value of each of n, i, and j is 1, and X is an integer multiple of Z; update the value of the $j^{th}$ program counter, and decode the obtained instruction to obtain a decoding result corresponding to the instruction in the $j^{th}$ thread; send the decoding result corresponding to the instruction in the $j^{th}$ thread to the processing unit; assign i=i+1, and compare a value of i with a value of each of X and Z; and if i is less than or equal to Z, assign j=j+1, and re-perform the process starting from the step of obtaining one instruction from a $j^{th}$ thread of the Z predefined threads based on a value of a $j^{th}$ program counter in an $i^{th}$ sending period of an $n^{th}$ cyclic period; if i is greater than Z and is less than or equal to X, assign j=a remainder obtained after i is divided by Z, and re-perform the process starting from the step of sending the decoding result corresponding to the instruction in the $j^{th}$ thread to the processing unit; or if i is greater than X, assign n=n+1, i=1, and j=1, and re-perform the process starting from the step of obtaining one instruction from a $j^{th}$ thread of the Z predefined threads based on a value of a $j^{th}$ program counter in an $i^{th}$ sending period of an $n^{th}$ cyclic period.

According to the technical solution provided in this embodiment of this application, a same instruction processing interval between two adjacent instructions in each thread can always be ensured, and instruction processing intervals corresponding to different threads are also the same. Therefore, a problem that complexity of a logic circuit of the processor is increased due to different instruction processing intervals can be avoided such that the logic circuit of the processor is simplified, thereby improving a clock rate of the processor.

In a possible design, the processor further includes a Z register; and the Z register is configured to store a value of Z.

In a possible design, the processor further includes a mode register; the mode register is configured to indicate an instruction scheduling mode to the decoding unit, and the instruction scheduling mode includes the first two or all of a thread level parallelism (TLP) mode, a data level parallelism (DLP) mode, and a hybrid mode; and the TLP mode is an instruction scheduling mode of the decoding unit when Z=X, the DLP mode is an instruction scheduling mode of the decoding unit when Z=1, and the hybrid mode is an instruction scheduling mode of the decoding unit when 1<Z<X.

In a possible design, one processing unit includes one data path and X groups of data registers, and each group of data registers includes at least one data register; and the data path is configured to: for a decoding result sent by the decoding unit in an $i^{th}$ sending period in each cyclic period, read, according to an address code in the decoding result, an operand from a data register that is in an $i^{th}$ group of data registers and that corresponds to the address code, where $1 \le i \le X$, and i is an integer; and perform an operation on the operand based on an operation code in the decoding result.

In a possible design, there are one or more processing units.

In the processor provided in this embodiment of this application, a plurality of processing units are configured to execute instructions in parallel, thereby further improving performance of the processor.

In a possible design, a clock rate of the decoding unit is lower than a clock rate of the processing unit.

In the processor provided in this embodiment of this application, the clock rate of the decoding unit is configured to be lower than the clock rate of the processing unit in order to reduce power consumption of the processor.

According to another aspect, an embodiment of this application provides an instruction scheduling method, applied to a decoding unit of a processor, where the processor supports X-channel interleaved multi-threading IMT, X is an integer greater than 1, and the method includes: obtaining, by the decoding unit, one instruction from each of Z predefined threads in each cyclic period, decoding the Z obtained instructions to obtain Z decoding results, and sending the Z decoding results to a processing unit, where each cyclic period includes X sending periods, one decoding result is sent to the processing unit in each sending period, a decoding result of the Z decoding results may be repeatedly sent by the decoding unit in a plurality of sending periods, $1 \le Z < X$ or Z=X, and Z is an integer.

In a possible design, the decoding unit includes an instruction decoder and X program counters. The method includes: assigning k=1, and obtaining, by the instruction decoder, one instruction from a $j^{th}$ thread of the Z predefined threads based on a value of a $j^{th}$ program counter in an $i^{th}$ sending period of an $n^{th}$ cyclic period, where an initial value of each of n, i, and j is 1, and X is an integer multiple of Z; updating, by the instruction decoder, the value of the $j^{th}$ program counter, and decoding the obtained instruction to obtain a decoding result corresponding to the instruction in the $j^{th}$ thread; sending, by the instruction decoder, the decoding result corresponding to the instruction in the $j^{th}$ thread to the processing unit; assigning i=i+1, and determining, by the instruction decoder, whether i is greater than X; and if i is less than or equal to X, assigning k=k+1, and determining, by the instruction decoder, whether k is greater than X/Z; if k is less than or equal to X/Z, re-performing, by the instruction decoder, the process starting from the step of sending the decoding result corresponding to the instruction in the $j^{th}$ thread to the processing unit; or if k is greater than X/Z, assigning j=j+1 and k=1, and re-performing, by the instruction decoder, the process starting from the step of obtaining one instruction from a $j^{th}$ thread of the Z predefined threads based on a value of a $j^{th}$ program counter in an $i^{th}$ sending period of an $n^{th}$ cyclic period; or if i is greater than X, assigning n=n+1, i=1, j=1, and k=1, and re-performing, by the instruction decoder, the process starting from the step of obtaining one instruction from a $j^{th}$ thread of the Z predefined threads based on a value of a $j^{th}$ program counter in an $i^{th}$ sending period of an $n^{th}$ cyclic period.

In a possible design, the decoding unit includes an instruction decoder and X program counters. The method includes: obtaining, by the instruction decoder, one instruction from a $j^{th}$ thread of the Z predefined threads based on a value of a $j^{th}$ program counter in an $i^{th}$ sending period of an $n^{th}$ cyclic period, where an initial value of each of n, i, and j is 1, and X is an integer multiple of Z; updating, by the instruction decoder, the value of the $j^{th}$ program counter, and decoding the obtained instruction to obtain a decoding result corresponding to the instruction in the $j^{th}$ thread; sending, by the instruction decoder, the decoding result corresponding to the instruction in the $j^{th}$ thread to the processing unit; assigning i=i+1, and comparing, by the instruction decoder, a value of i with a value of each of X and Z; and if i is less than or equal to Z, assigning j=j+1, and re-performing, by the instruction decoder, the process starting from the step of obtaining one instruction from a $j^{th}$ thread of the Z predefined threads based on a value of a $j^{th}$ program counter in an $i^{th}$ sending period of an $n^{th}$ cyclic period; or if i is greater than Z and is less than or equal to X, assigning j=a remainder obtained after i is divided by Z, and re-performing, by the instruction decoder, the process starting from the step of sending the decoding result corresponding to the instruction in the $j^{th}$ thread to the processing unit; or if i is greater than X, assigning n=n+1, i=1, and j=1, and re-performing, by the instruction decoder, the process starting from the step of obtaining one instruction from a $j^{th}$ thread of the Z predefined threads based on a value of a $j^{th}$ program counter in an $i^{th}$ sending period of an $n^{th}$ cyclic period.

According to the technical solution provided in this embodiment of this application, when a quantity of threads executed by the processor is less than a maximum quantity of threads supported by the processor, the decoding unit repeatedly sends the decoding result to the processing unit in the plurality of sending periods such that the decoding unit sends one decoding result to the processing unit in each sending period. Therefore, there is no idle time period in which no instruction is executed in the processing unit such that the processing unit is fully utilized, high utilization of the processing unit is ensured, and performance of the processing unit can be fully utilized.

DESCRIPTION OF EMBODIMENTS

To make the objectives, technical solutions, and advantages of this application clearer, the following further describes the implementations of this application in detail with reference to the accompanying drawings.

Figure 1:
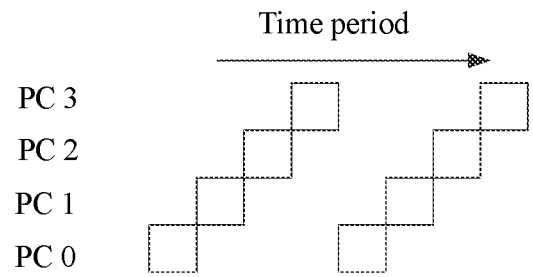
FIG. 1 is a schematic diagram of an instruction scheduling process of a processor using an S-IMT technology in another disclosure.
Figure 2:
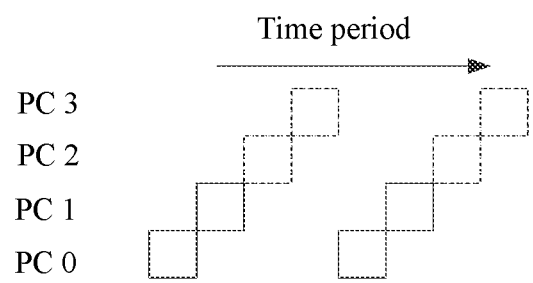
FIG. 2 is a schematic diagram of another instruction scheduling process of a processor using an S-IMT technology in another disclosure.
Figure 3A:
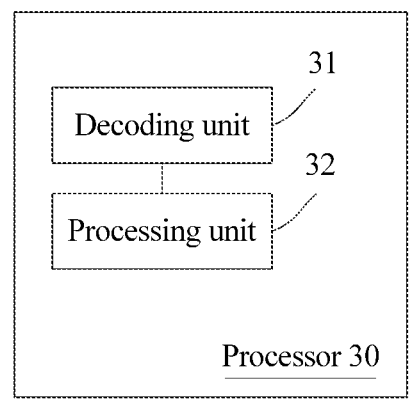
FIG. 3A is a schematic structural diagram of a processor according to an embodiment of this application.

FIG. 3A is a schematic structural diagram of a processor according to an embodiment of this application. A processor 30 supports X-channel IMT, and X is an integer greater than 1. The processor 30 may include a decoding unit 31 and a processing unit (PU) 32.

The decoding unit 31 is configured to: obtain one instruction from each of Z predefined threads in each cyclic period, decode the Z obtained instructions to obtain Z decoding results, and send the Z decoding results to the processing unit 32, where $1 \leq Z < X$ or Z=X, and Z is an integer.

A maximum quantity of threads supported by the processor 30 is X, and a quantity of threads executed by the processor 30 is Z. Because $Z \leq X$, the quantity of threads executed by the processor 30 is equal to or less than the maximum quantity of threads supported by the processor 30. The quantity Z of threads executed by the processor 30 may be predefined, for example, a value of Z is predefined based on a specific status of a program that needs to be executed.

Each cyclic period includes X sending periods. The decoding unit 31 sends one decoding result to the processing unit 32 in each sending period. A decoding result of the Z decoding results may be repeatedly sent by the decoding unit 31 in a plurality of sending periods. In this case, when $1 \leq Z < X$, at least one of the Z decoding results is repeatedly sent by the decoding unit 31 in the plurality of sending periods.

In an example, it is assumed that X=4 and Z=2, in other words, the maximum quantity of threads supported by the processor 30 is 4, and the quantity of threads executed by the processor 30 is 2, and it is assumed that program counters corresponding to the two-executed threads are a PC 0 and a PC 1. The first cyclic period is used as an example. In the first cyclic period, the decoding unit 31 obtains the first instruction (denoted as an instruction 1) in a thread corresponding to the PC 0, and obtains the first instruction (denoted as an instruction 2) in a thread corresponding to the PC 1. The decoding unit 31 decodes the instruction 1 and the instruction 2 to obtain a decoding result 1 and a decoding result 2. One cyclic period includes four sending periods. The decoding unit 31 sends one decoding result to the processing unit 32 in each sending period, and therefore at least one of the decoding result 1 and/or the decoding result 2 is repeatedly sent by the decoding unit 31 in the four sending periods. Specifically, the following possible implementations are included below.

Figure 3B:
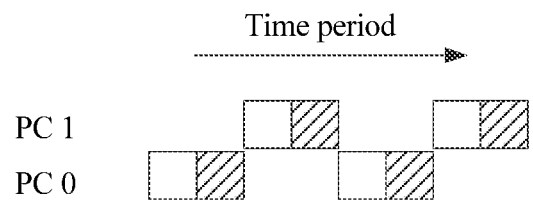
FIG. 3B is a schematic diagram of an instruction scheduling process of the processor in the embodiment of FIG. 3A.

1. Respectively send the decoding result 1, the decoding result 1, the decoding result 2, and the decoding result 2 in the first to the fourth sending periods (as shown in FIG. 3B);
2. Respectively send the decoding result 1, the decoding result 1, the decoding result 1, and the decoding result 2 in the first to the fourth sending periods;
3. Respectively send the decoding result 1, the decoding result 2, the decoding result 2, and the decoding result 2 in the first to the fourth sending periods;
4. Respectively send the decoding result 1, the decoding result 2, the decoding result 1, and the decoding result 2 in the first to the fourth sending periods;
5. Respectively send the decoding result 1, the decoding result 2, the decoding result 2, and the decoding result 1 in the first to the fourth sending periods; and
6. Respectively send the decoding result 1, the decoding result 1, the decoding result 2, and the decoding result 1 in the first to the fourth sending periods.

Similarly, in each subsequent cyclic period, the decoding unit 31 obtains one next unexecuted instruction from each of the threads corresponding to the PC 0 and the PC 1, decodes the instructions to obtain decoding results, and sends the two decoding results in the four sending periods, where at least one decoding result is repeatedly sent by the decoding unit 31 in the plurality of sending periods.

The processing unit 32 is configured to execute the instruction based on the decoding result.

Optionally, the processing unit 32 is configured to execute the instruction based on the decoding result using a pipelining technology in order to process a plurality of instructions parallelly, and improve instruction execution efficiency.

In conclusion, according to the technical solution provided in this embodiment of this application, when the quantity of threads executed by the processor is less than the maximum quantity of threads supported by the processor, the decoding unit repeatedly sends the decoding result to the processing unit in the plurality of sending periods such that the decoding unit sends one decoding result to the processing unit in each sending period. Therefore, there is no idle time period in which no instruction is executed in the processing unit such that the processing unit is fully utilized, high utilization of the processing unit is ensured, and performance of the processing unit can be fully utilized.

The IMT technology used in this embodiment of this application described in this specification may be referred to as an SS-IMT (Static SIMD IMT) technology.

Figure 4:
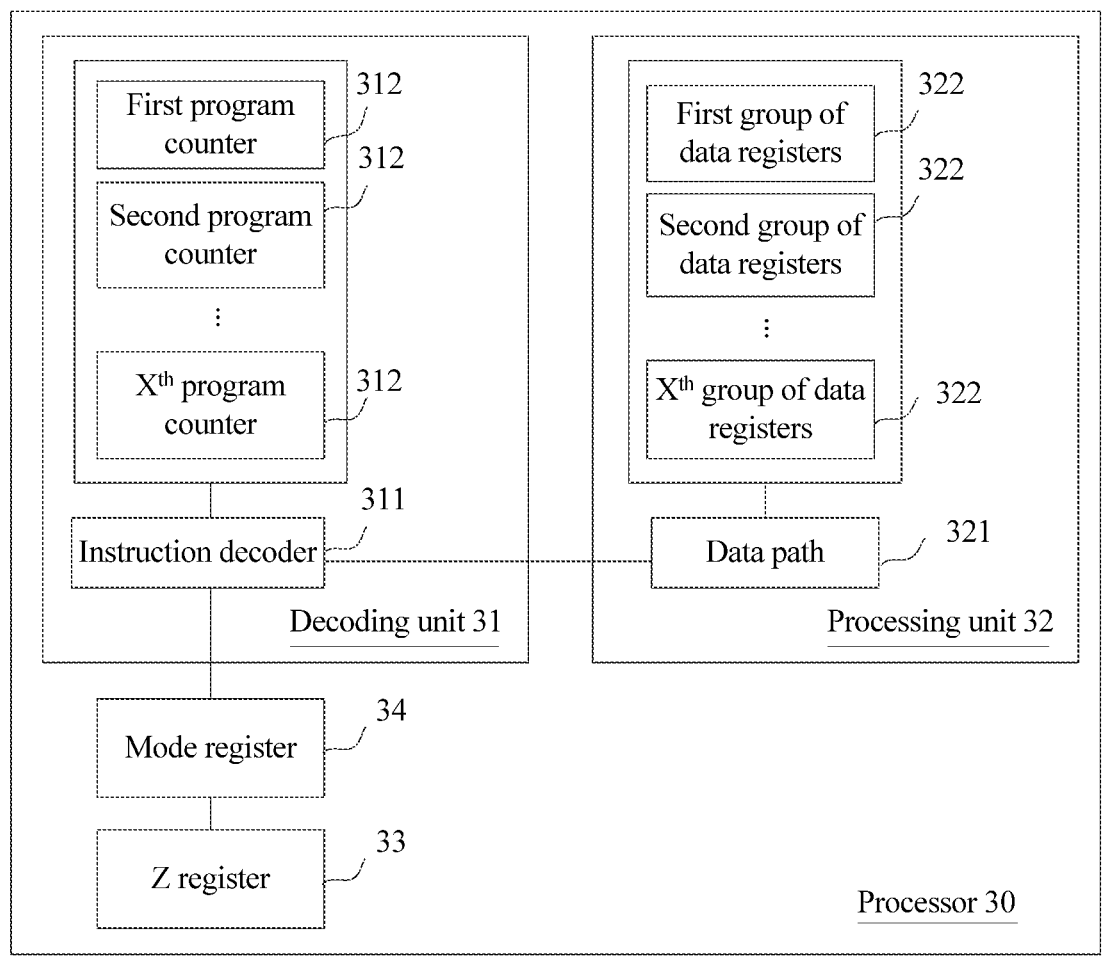
FIG. 4 is a schematic structural diagram of a processor according to another embodiment of this application.

FIG. 4 is a schematic structural diagram of a processor according to another embodiment of this application. A processor 30 supports X-channel IMT, and X is an integer greater than 1. The processor 30 may include a decoding unit 31 and a processing unit 32.

The decoding unit 31 is mainly configured to decode an instruction. The decoding unit 31 may include an instruction decoder 311 and X program counters 312. The instruction decoder 311 is configured to decode the instruction to obtain a decoding result. The instruction includes an operation code and an address code. The operation code is used to indicate an operation feature and a function of the instruction, and the address code is used to indicate an address of an operand that participates in an operation. Each program counter 312 corresponds to one thread, the program counter 312 is configured to store an instruction address, and the instruction address is a storage address of a next to-be-executed instruction.

The processing unit 32 is mainly configured to execute the instruction based on the decoding result. The decoding result includes the operation code and the address code of the instruction. The processing unit 32 may include a data path 321 and X groups of data registers 322. The data path 321 is configured to: obtain an operand according to the address code of the instruction, and perform a corresponding operation on the operand based on the operation code of the instruction. The data register 322 is configured to store the operand. Each group of data registers 322 includes at least one data register.

As shown in FIG. 4, in this embodiment of this application, the processor 30 further includes a Z register 33. The Z register 33 is configured to store a value of Z; in other words, is configured to store a quantity Z of threads executed by the processor 30. The value of Z is predefined in the Z register 33, for example, the value of Z is predefined in the Z register 33 based on a specific status of a program that needs to be executed. The value of Z is an integer greater than or equal to 1 and less than or equal to X.

Figure 5:
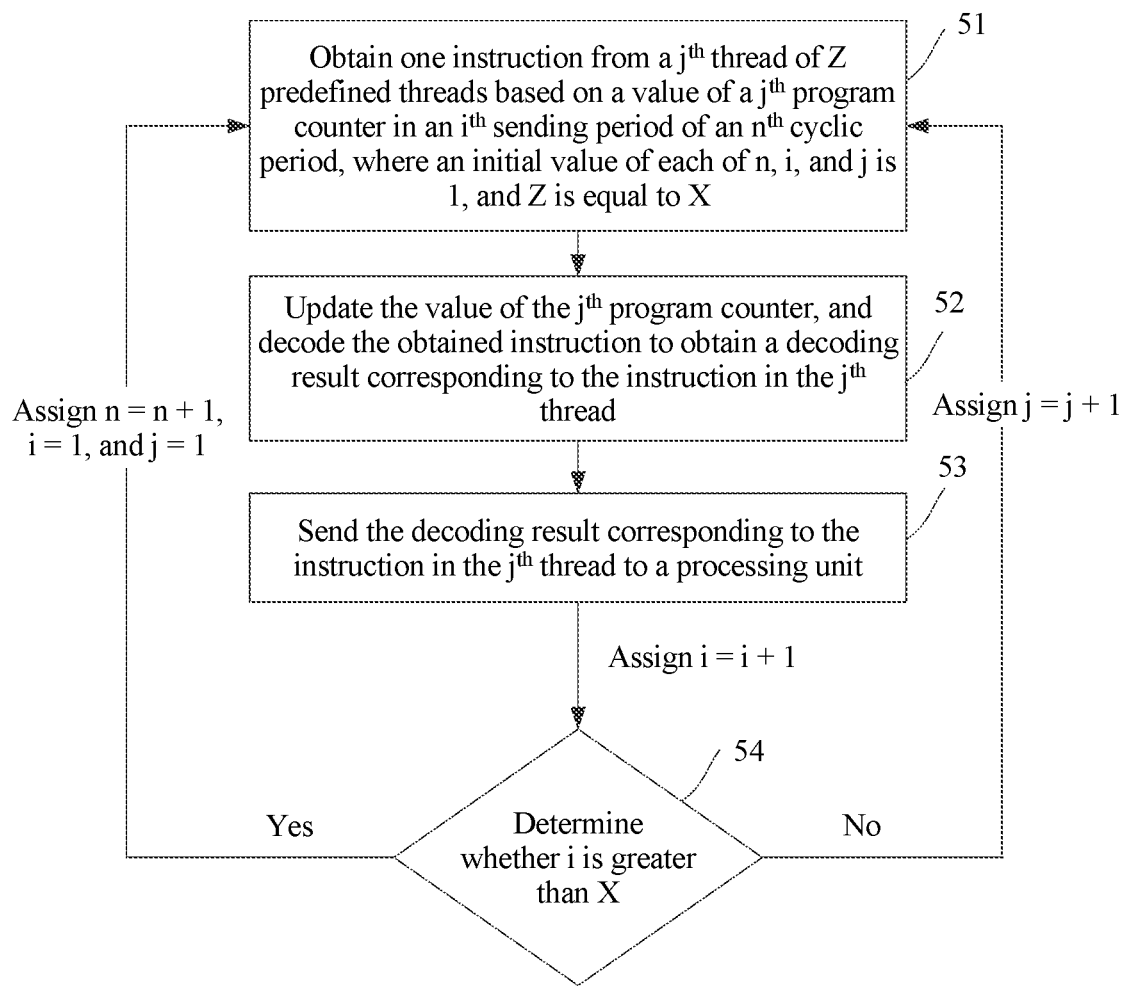
FIG. 5 is a flowchart of an instruction scheduling process when Z=X.

When Z=X, the quantity of threads executed by the processor 30 is equal to a maximum quantity of threads supported by the processor 30. FIG. 5 shows an instruction scheduling sequence of the instruction decoder 311 when Z=X. The instruction decoder 311 is configured to perform the following steps:

Step 51: Obtain one instruction from a $j^{th}$ thread of Z predefined threads based on a value of a $j^{th}$ program counter in an $i^{th}$ sending period of an $n^{th}$ cyclic period, where an initial value of each of n, i, and j is 1, and Z is equal to X.

Step 52: Update the value of the $j^{th}$ program counter, and decode the obtained instruction to obtain a decoding result corresponding to the instruction in the $j^{th}$ thread.

Step 53: Send the decoding result corresponding to the instruction in the $j^{th}$ thread to the processing unit.

Step 54: Assign i=i+1, and determine whether i is greater than X; and if no (in other words, i≤X), assign j=j+1, and re-perform the process starting from step 51; or if yes (in other words, i>X), assign n=n+1, i=1, and j=1, and re-perform the process starting from step 51.

Figure 6:
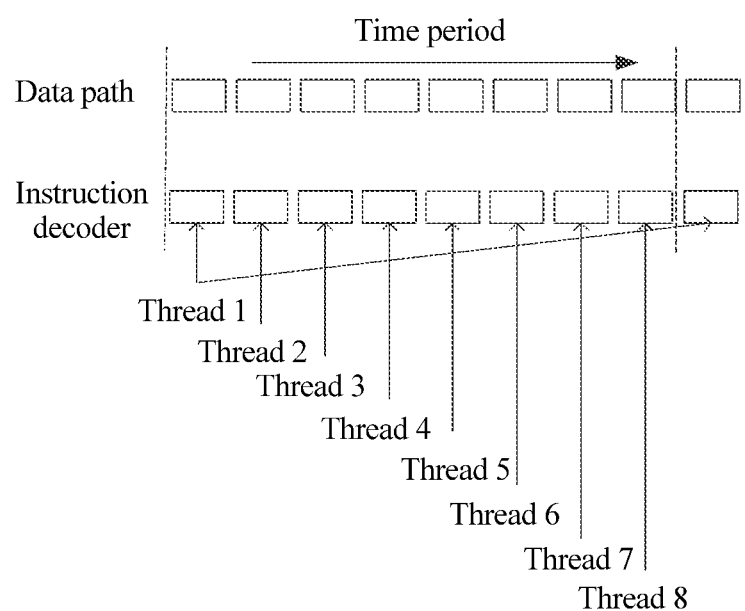
FIG. 6 is a schematic diagram of an instruction scheduling process when Z=X.

For example, X=8. When Z=X=8, the instruction scheduling sequence of the instruction decoder 311 is shown in FIG. 6.

When Z=X, an instruction scheduling mode of the instruction decoder 311 may be referred to as a TLP mode.

When 1≤Z<X, the quantity of threads executed by the processor 30 is less than the maximum quantity of threads supported by the processor 30. The instruction decoder 311 schedules instructions according to the instruction scheduling sequence described in the foregoing embodiment of FIG. 3A. The following describes two possible instruction scheduling sequences of the instruction decoder 311.

Figure 7:
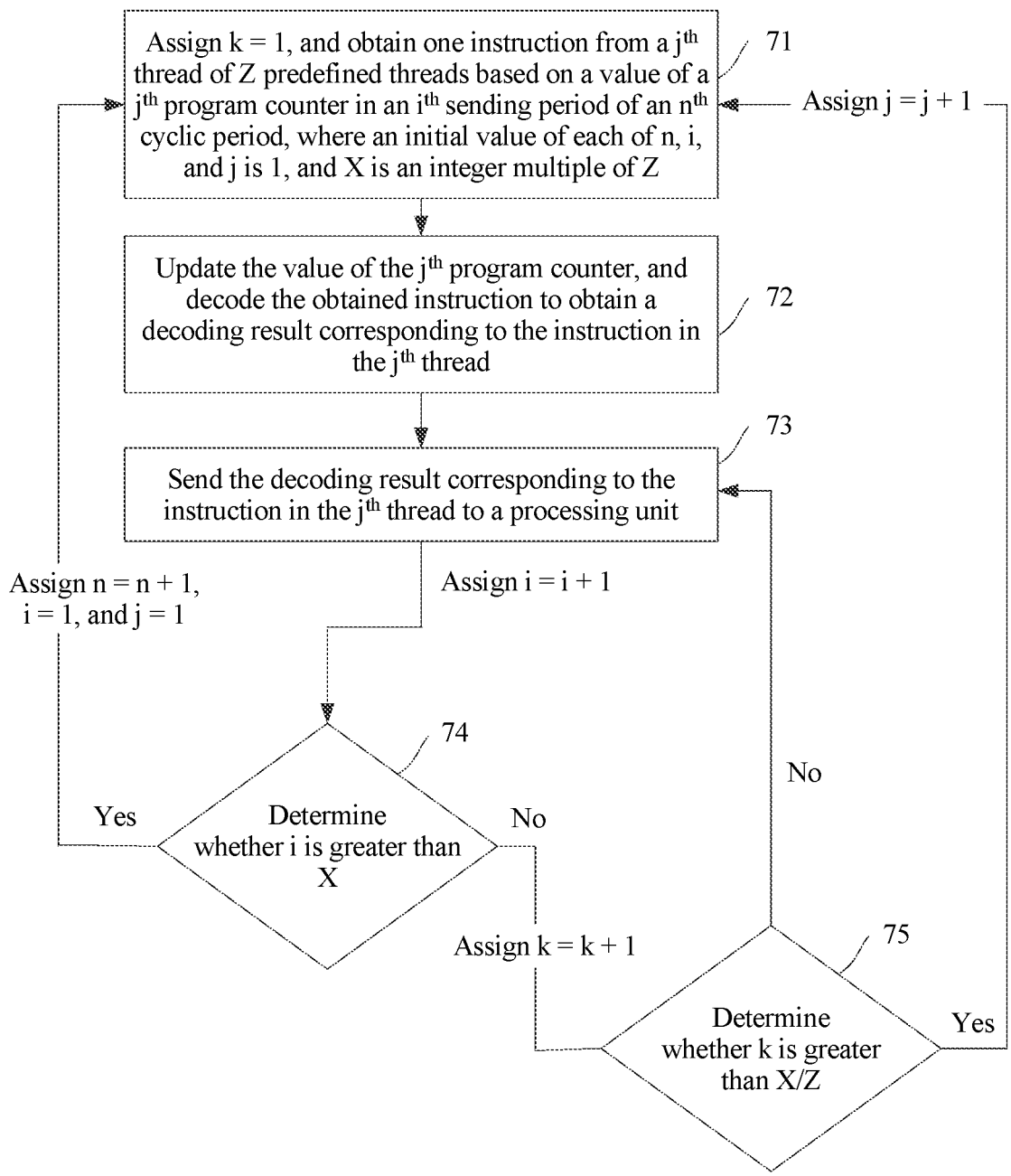
FIG. 7 is a flowchart of an instruction scheduling process when $1 \leq Z < X$.

In a first possible implementation, as shown in FIG. 7, the instruction decoder 311 is configured to perform the following steps.

Step 71: Assign k=1, and obtain one instruction from a $j^{th}$ thread of Z predefined threads based on a value of a $j^{th}$ program counter in an $i^{th}$ sending period of an $n^{th}$ cyclic period, where an initial value of each of n, i, and j is 1, and X is an integer multiple of Z.

Step 72: Update the value of the $j^{th}$ program counter, and decode the obtained instruction to obtain a decoding result corresponding to the instruction in the $j^{th}$ thread.

Step 73: Send the decoding result corresponding to the instruction in the $j^{th}$ thread to the processing unit.

Step 74: Assign i=i+1, and determine whether i is greater than X; and if no (in other words, i≤X), perform step 75; or if yes (in other words, i>X), assign n=n+1, i=1, j=1, and k=1, and re-perform the process starting from step 71.

Step 75: Assign k=k+1, and determine whether k is greater than X/Z; and if no (in other words, k≤X/Z), re-perform the process starting from step 73; or if yes (in other words, k>X/Z), assign j=j+1 and k=1, and re-perform the process starting from step 71.

Figure 8:
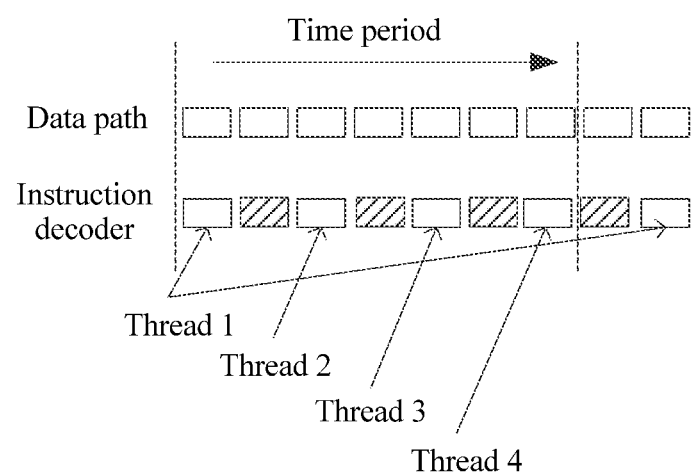
FIG. 8 is a schematic diagram of an instruction scheduling process when $1 \leq Z < X$.

For example, X=8 and Z=4. In the first possible implementation, the instruction scheduling sequence of the instruction decoder 311 is shown in FIG. 8.

Figure 9:
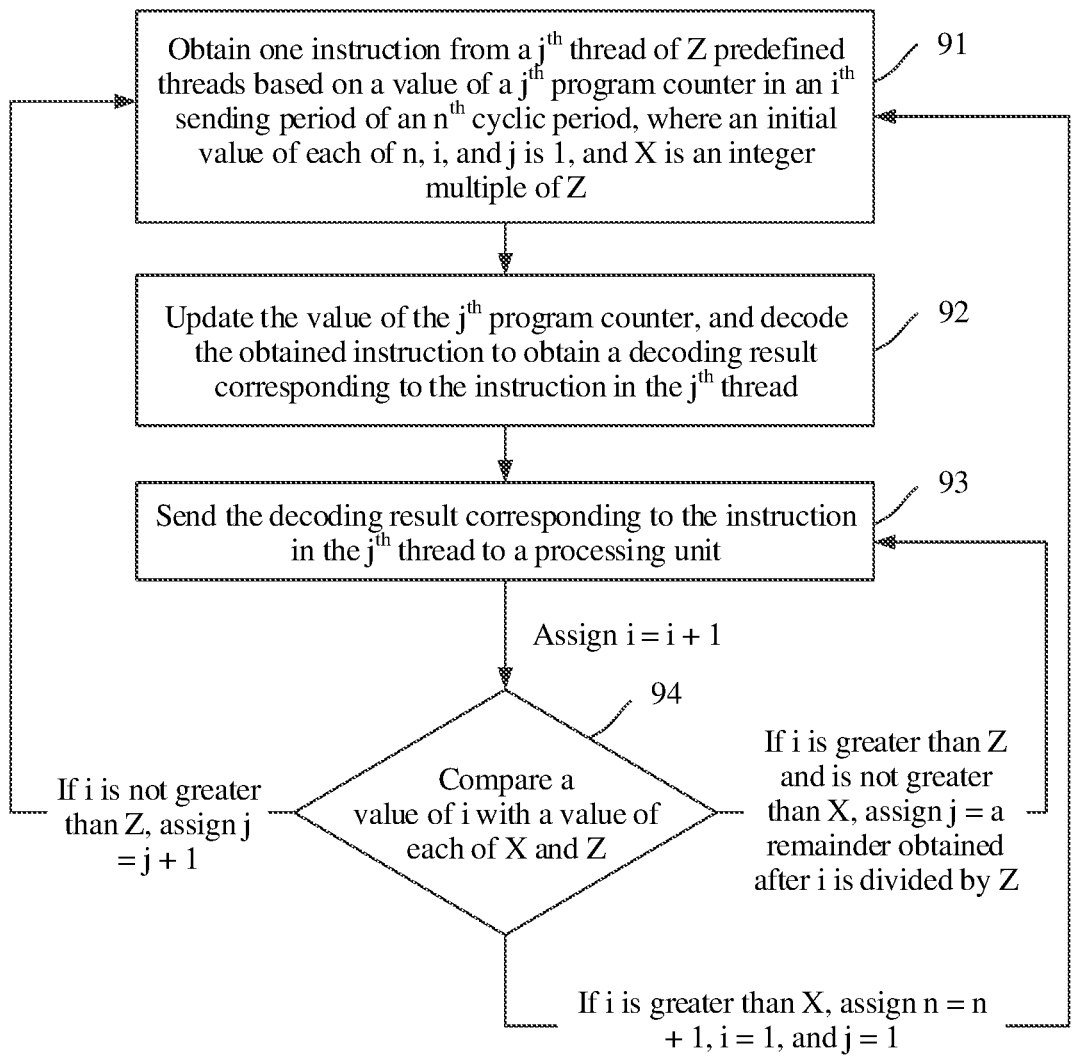
FIG. 9 is a flowchart of another instruction scheduling process when $1 \leq Z < X$.

In a second possible implementation, as shown in FIG. 9, the instruction decoder 311 is configured to perform the following steps.

Step 91: Obtain one instruction from a $j^{th}$ thread of Z predefined threads based on a value of a $j^{th}$ program counter in an $i^{th}$ sending period of an $n^{th}$ cyclic period, where an initial value of each of n, i, and j is 1, and X is an integer multiple of Z.

Step 92: Update the value of the $j^{th}$ program counter, and decode the obtained instruction to obtain a decoding result corresponding to the instruction in the $j^{th}$ thread.

Step 93: Send the decoding result corresponding to the instruction in the $j^{th}$ thread to the processing unit.

Step 94: Assign i=i+1, and compare a value of i with a value of each of X and Z; and if i≤Z, assign j=j+1, and re-perform the process starting from step 91; or if Z<i≤X, assign j=a remainder obtained after i is divided by Z, and re-perform the process starting from step 93; or if i>X, assign n=n+1, i=1, and j=1, and re-perform the process starting from step 91.

Figure 10:
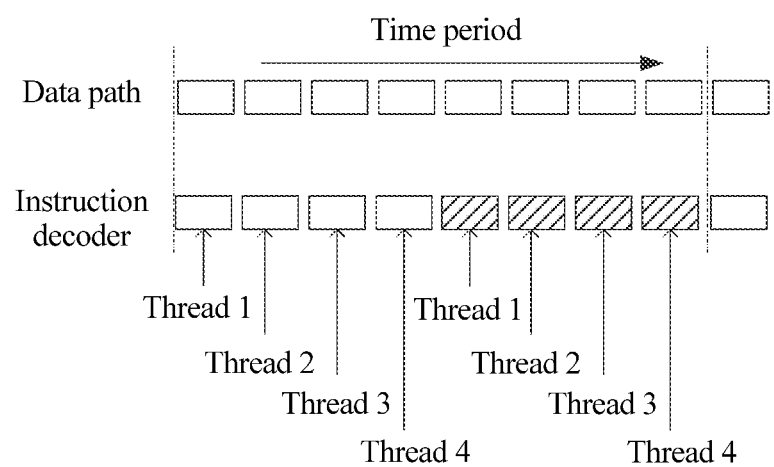
FIG. 10 is a schematic diagram of another instruction scheduling process when $1 \leq Z < X$.

For example, X=8 and Z=4. In the second possible implementation, the instruction scheduling sequence of the instruction decoder 311 is shown in FIG. 10.

Based on a comparison between the foregoing two implementations, in the first possible implementation, the instruction decoder 311 sends a same decoding result to the processing unit 32 in consecutive sending periods, and therefore no additional cache needs to be configured to store the decoding result, which helps reduce hardware costs of the processor 30.

In addition, when Z=1, the instruction decoder 311 is configured to: obtain one instruction from one predefined thread in each cyclic period, decode the obtained instruction to obtain one decoding result, and repeatedly send the decoding result to the processing unit 32 in X sending periods included in the cyclic period. The instruction decoder 311 sends one decoding result to the processing unit 32 in each sending period.

Figure 11:
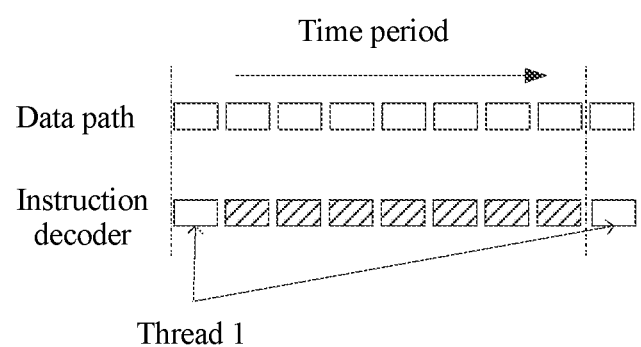
FIG. 11 is a schematic diagram of an instruction scheduling process when Z=1.

For example, X=8 and Z=1. The instruction scheduling sequence of the instruction decoder 311 is shown in FIG. 11.

When Z=1, the instruction scheduling mode of the instruction decoder 311 may be referred to as a DLP mode; or when 1<Z<X, the instruction scheduling mode of the instruction decoder 311 may be referred to as a hybrid mode, a DTLP mode, or a TDLP mode.

In an embodiment, the instruction decoder 311 obtains the value of Z from the Z register 33, determines the instruction scheduling mode based on a value relationship between Z and X, and further schedules an instruction according to the determined instruction scheduling mode. The instruction scheduling mode includes the first two or all of the TLP mode, the DLP mode, and the hybrid mode. In an embodiment, in one case, the processor 30 supports two instruction scheduling modes: the TLP mode and the DLP mode; and in the other case, the processor 30 supports three instruction scheduling modes: the TLP mode, the DLP mode, and the hybrid mode.

Optionally, as shown in FIG. 4, the processor 30 further includes a mode register 34. The mode register 34 is configured to indicate the instruction scheduling mode to the decoding unit 31, where the instruction scheduling mode includes the first two or all of the TLP mode, the DLP mode, and the hybrid mode.

In an embodiment, the mode register 34 obtains the value of Z from the Z register 33, determines the instruction scheduling mode based on a value relationship between Z and X, and sets a value of the mode register 34 according to the determined instruction scheduling mode. The instruction decoder 311 obtains the value of the mode register 34, determines the instruction scheduling mode based on the value of the mode register 34, and further schedules an instruction according to the determined instruction scheduling mode.

In one case, the processor 30 supports two instruction scheduling modes: the TLP mode and the DLP mode. The TLP mode is represented by a first value, the DLP mode is represented by a second value, and the first value is different from the second value. For example, the first value is 0 and the second value is 1, or the first value is 1 and the second value is 0. When the processor 30 supports the foregoing two instruction scheduling modes, the mode register 34 occupies 1 bit (bit).

In the other case, the processor 30 supports three instruction scheduling modes: the TLP mode, the DLP mode, and the hybrid mode. The TLP mode is represented by a first value, the DLP mode is represented by a second value, the hybrid mode is represented by a third value, and the first value, the second value, and the third value are different from each other. For example, the first value is 0, the second value is 1, and the third value is 2. When the processor 30 supports the foregoing three instruction scheduling modes, the mode register 34 occupies 2 bits.

In addition, regardless of which instruction scheduling mode is used by the decoding unit 31 to schedule the instruction, the data path 321 of the processing unit 32 executes the instruction in the following manner. The data path 321 is configured to: for a decoding result sent by the decoding unit 31 in an $i^{th}$ sending period in each cyclic period, read, according to an address code in the decoding result, an operand from a data register that is in an $i^{th}$ group of data registers and that corresponds to the address code, where 1≤i≤X, and i is an integer; and perform an operation on the read operand based on an operation code in the decoding result.

Figure 12:
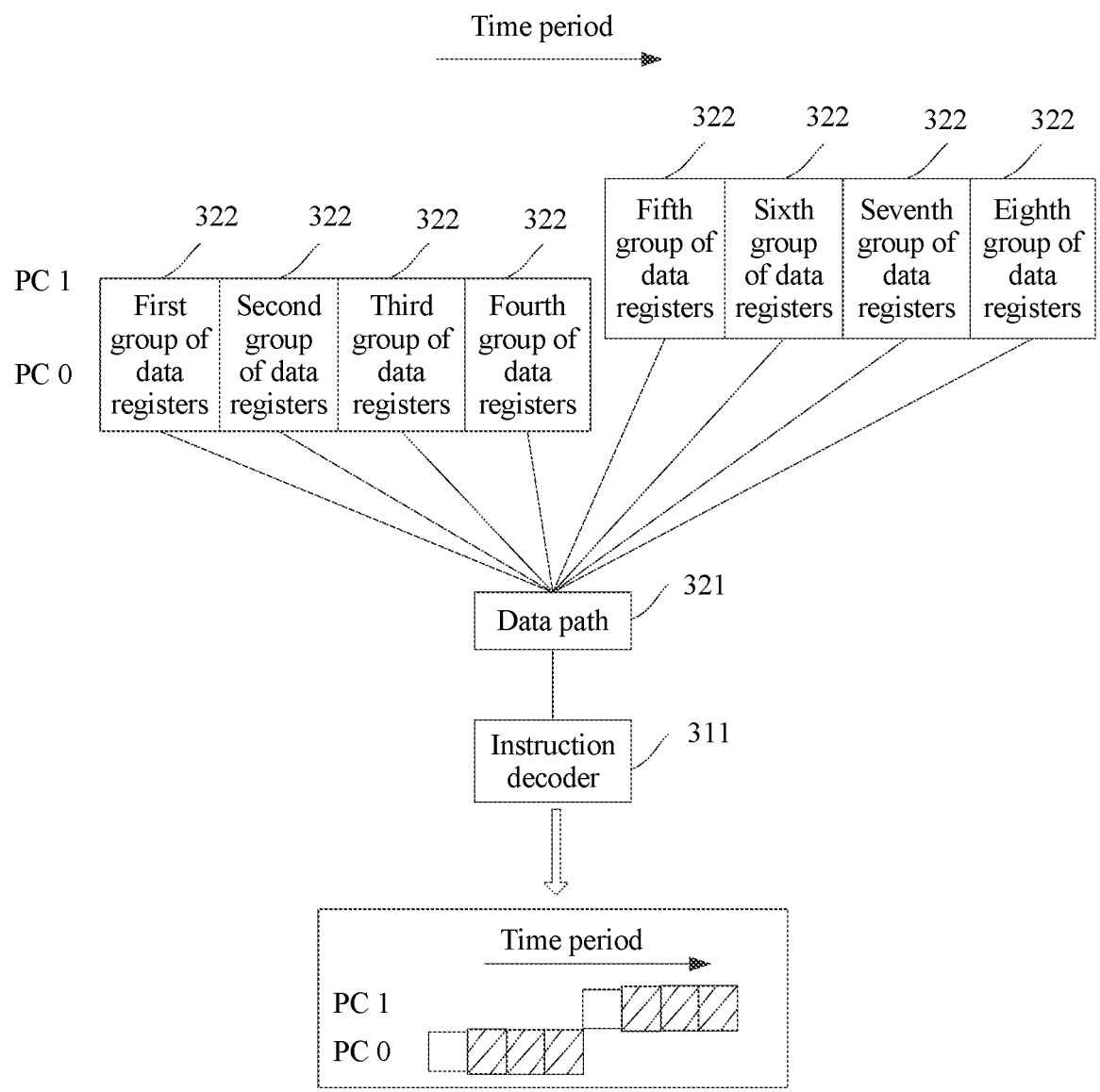
FIG. 12 is a schematic diagram of scheduling and executing an instruction in a hybrid mode.

For example, X=8 and Z=2. The processor 30 schedules the instruction in the hybrid mode using the first possible implementation described above. A corresponding scheduling and execution process is shown in FIG. 12. It is assumed that a PC 0 and a PC 1 respectively represent the program counters of the foregoing two threads. In each cyclic period, an instruction scheduling and execution process is as follows:

In the first sending period, the instruction decoder 311 obtains one instruction from the first thread based on a value of the PC 0, decodes the instruction to obtain a decoding result (denoted as a decoding result 1), and sends the decoding result 1 to the data path 321. The data path 321 reads, according to an address code in the decoding result 1, an operand from a data register that is in the first group of data registers and that corresponds to the address code, and performs an operation on the read operand based on an operation code in the decoding result 1.

In the second sending period, the instruction decoder 311 sends the decoding result 1 to the data path 321 again. The data path 321 reads, according to the address code in the decoding result 1, an operand from a data register that is in the second group of data registers and that corresponds to the address code, and performs an operation on the read operand based on the operation code in the decoding result 1.

In the third sending period, the instruction decoder 311 sends the decoding result 1 to the data path 321 again. The data path 321 reads, according to the address code in the decoding result 1, an operand from a data register that is in the third group of data registers and that corresponds to the address code, and performs an operation on the read operand based on the operation code in the decoding result 1.

In the fourth sending period, the instruction decoder 311 sends the decoding result 1 to the data path 321 again. The data path 321 reads, according to the address code in the decoding result 1, an operand from a data register that is in the fourth group of data registers and that corresponds to the address code, and performs an operation on the read operand based on the operation code in the decoding result 1.

In the fifth sending period, the instruction decoder 311 obtains one instruction from the second thread based on a value of the PC 1, decodes the instruction to obtain a decoding result (denoted as a decoding result 2), and sends the decoding result 2 to the data path 321. The data path 321 reads, according to an address code in the decoding result 2, an operand from a data register that is in the fifth group of data registers and that corresponds to the address code, and performs an operation on the read operand based on an operation code in the decoding result 2.

In the sixth sending period, the instruction decoder 311 sends the decoding result 2 to the data path 321 again. The data path 321 reads, according to the address code in the decoding result 2, an operand from a data register that is in the sixth group of data registers and that corresponds to the address code, and performs an operation on the read operand based on the operation code in the decoding result 2.

In the seventh sending period, the instruction decoder 311 sends the decoding result 2 to the data path 321 again. The data path 321 reads, according to the address code in the decoding result 2, an operand from a data register that is in the seventh group of data registers and that corresponds to the address code, and performs an operation on the read operand based on the operation code in the decoding result 2.

In the eighth sending period, the instruction decoder 311 sends the decoding result 2 to the data path 321 again. The data path 321 reads, according to the address code in the decoding result 2, an operand from a data register that is in the eighth group of data registers and that corresponds to the address code, and performs an operation on the read operand based on the operation code in the decoding result 2.

For example, it is assumed that the operation code in the decoding result 1 is used to indicate an addition operation, and the address code in the decoding result 1 is used to indicate the third data register; and the operation code in the decoding result 2 is used to indicate a subtraction operation, and the address code in the decoding result 2 is used to indicate the second data register.

After receiving the decoding result 1 that is sent by the instruction decoder 311 in the first sending period, the data path 321 reads operands (which are assumed as x1 and y1) from the third data register in the first group of data registers, and performs an addition operation on the operands; in other words, calculates a sum of x1 and y1 to obtain z1.

After receiving the decoding result 1 that is sent by the instruction decoder 311 in the second sending period, the data path 321 reads operands (which are assumed as x2 and y2) from the third data register in the second group of data registers, and performs an addition operation on the operands; in other words, calculates a sum of x2 and y2 to obtain z2.

After receiving the decoding result 1 that is sent by the instruction decoder 311 in the third sending period, the data path 321 reads operands (which are assumed as x3 and y3) from the third data register in the third group of data registers, and performs an addition operation on the operands; in other words, calculates a sum of x3 and y3 to obtain z3.

After receiving the decoding result 1 that is sent by the instruction decoder 311 in the fourth sending period, the data path 321 reads operands (which are assumed as x4 and y4) from the third data register in the fourth group of data registers, and performs an addition operation on the operands; in other words, calculates a sum of x4 and y4 to obtain z4.

After receiving the decoding result 2 that is sent by the instruction decoder 311 in the fifth sending period, the data path 321 reads operands (which are assumed as x5 and y5) from the second data register in the fifth group of data registers, and performs a subtraction operation on the operands; in other words, calculates a difference between x5 and y5 to obtain z5.

After receiving the decoding result 2 that is sent by the instruction decoder 311 in the sixth sending period, the data path 321 reads operands (which are assumed as x6 and y6) from the second data register in the sixth group of data registers, and performs a subtraction operation on the operands; in other words, calculates a difference between x6 and y6 to obtain z6.

After receiving the decoding result 2 that is sent by the instruction decoder 311 in the seventh sending period, the data path 321 reads operands (which are assumed as x7 and y7) from the second data register in the seventh group of data registers, and performs a subtraction operation on the operands; in other words, calculates a difference between x7 and y7 to obtain z7.

After receiving the decoding result 2 that is sent by the instruction decoder 311 in the eighth sending period, the data path 321 reads operands (which are assumed as x8 and y8) from the second data register in the eighth group of data registers, and performs a subtraction operation on the operands; in other words, calculates a difference between x8 and y8 to obtain z8.

In conclusion, according to the technical solution provided in this embodiment of this application, when the quantity of threads executed by the processor is less than the maximum quantity of threads supported by the processor, the decoding unit may repeatedly send the decoding result to the processing unit in the plurality of sending periods such that the decoding unit sends one decoding result to the processing unit in each sending period. Therefore, there is no idle time period in which no instruction is executed in the processing unit such that the processing unit is fully utilized, high utilization of the processing unit is ensured, and performance of the processing unit can be fully utilized.

In addition, according to the technical solution provided in this embodiment of this application, a same instruction processing interval between two adjacent instructions in each thread can always be ensured, and instruction processing intervals corresponding to different threads are also the same. Therefore, a problem that complexity of a logic circuit of the processor is increased due to different instruction processing intervals can be avoided such that the logic circuit of the processor is simplified, thereby improving a clock rate of the processor.

In this embodiment of this application, there are one or more processing units 32.

When there are a plurality of processing units 32, the decoding unit 31 sends a decoding result of an instruction to the plurality of processing units 32, and the plurality of processing units 32 execute the instruction parallelly, thereby further improving performance of the processor.

Figure 13A:
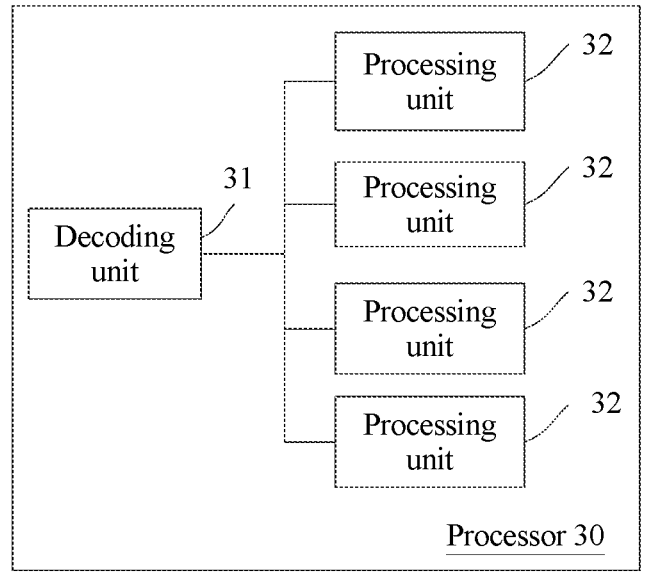
FIG. 13A is a schematic structural diagram of a processor according to another embodiment of this application.

In an example, as shown in FIG. 13A, the processor 30 includes a decoding unit 31 and four processing units 32. The decoding unit 31 includes an instruction decoder 311 and X program counters 312. Each processing unit 32 includes a data path 321 and X groups of data registers 322. Each group of data registers 322 includes at least one data register. Quantities of data registers included in different groups of data registers 322 may be the same or may be different.

Figure 13B:
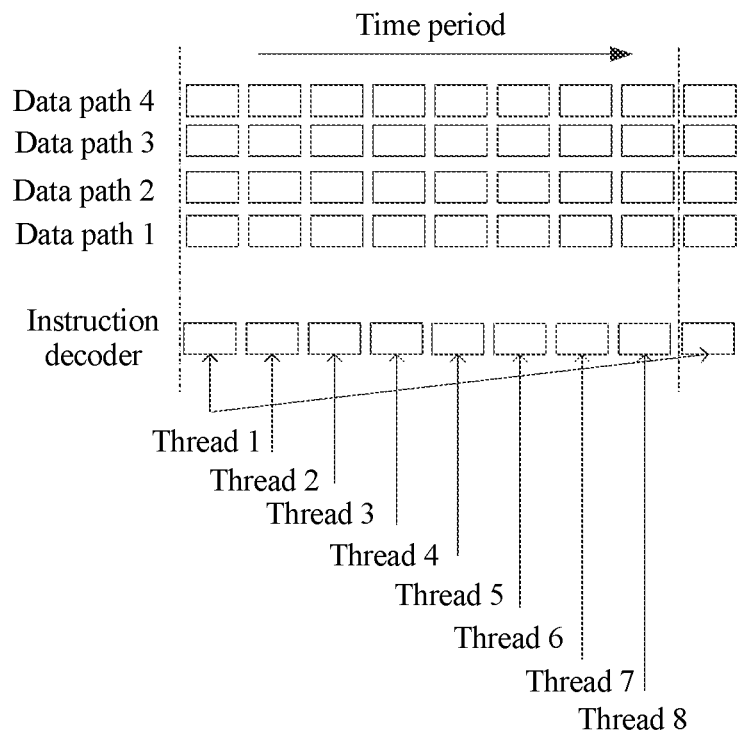
FIG. 13B is a schematic diagram in which the processor according to the embodiment of FIG. 13A schedules an instruction in a TLP mode.
Figure 13C:
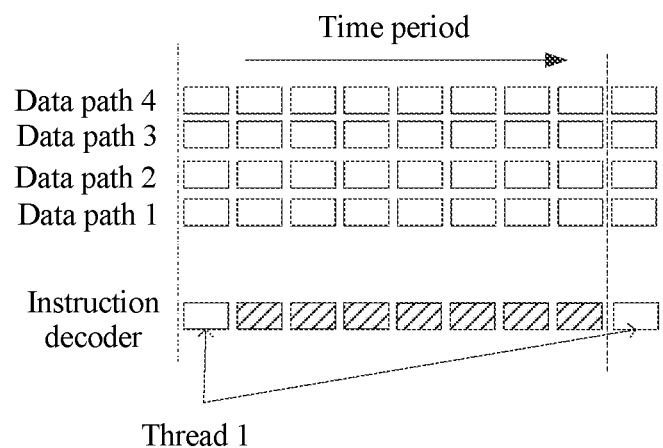
FIG. 13C is a schematic diagram in which the processor according to the embodiment of FIG. 13A schedules an instruction in a DLP mode.
Figure 13D:
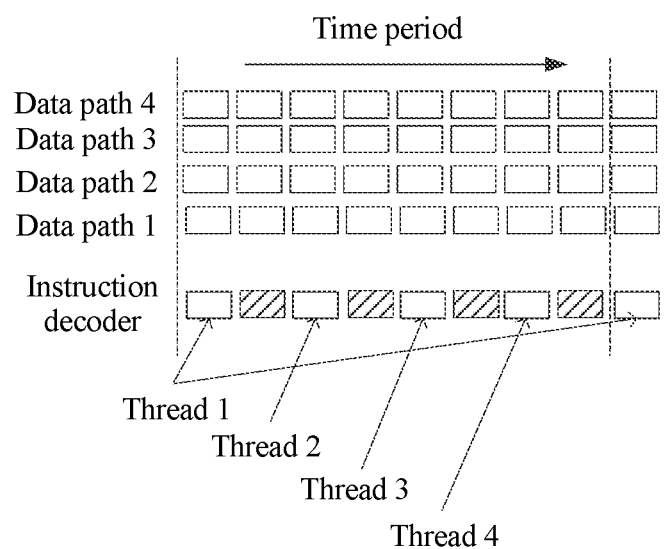
FIG. 13D is a schematic diagram in which the processor according to the embodiment of FIG. 13A schedules an instruction in a hybrid mode.

For example, X=8. An instruction scheduling process of the processor 30 in a TLP mode is shown in FIG. 13B, an instruction scheduling process of the processor 30 in a DLP mode is shown in FIG. 13C, and an instruction scheduling process of the processor 30 in a hybrid mode is shown in FIG. 13D.

In the processor provided in this embodiment of this application, a plurality of processing units are configured to execute instructions parallelly, thereby further improving performance of the processor.

Optionally, in this embodiment of this application, a clock rate of the decoding unit 31 is allowed to be lower than a clock rate of the processing unit 32. In other words, a clock rate of the instruction decoder 311 is lower than a clock rate of the data path 321. A clock rate of a component reflects working efficiency of the component. A higher clock rate indicates higher working efficiency and higher corresponding power consumption. On the contrary, a lower clock rate indicates lower working efficiency and lower corresponding power consumption.

If it is assumed that the clock rate of the decoding unit 31 is $1/w$ of the clock rate of the processing unit 32, w is a positive integer power of 2, and $w<X$, a maximum quantity of threads supported by the processor 30 is reduced from X to $X/w$. In this case, when $Z=X/w$, an instruction scheduling mode of the decoding unit 31 is a TLP mode. When $Z=1$, the instruction scheduling mode of the decoding unit 31 is a DLP mode. When $1<Z<X/w$, the instruction scheduling mode of the decoding unit 31 is a hybrid mode.

Figure 14A:
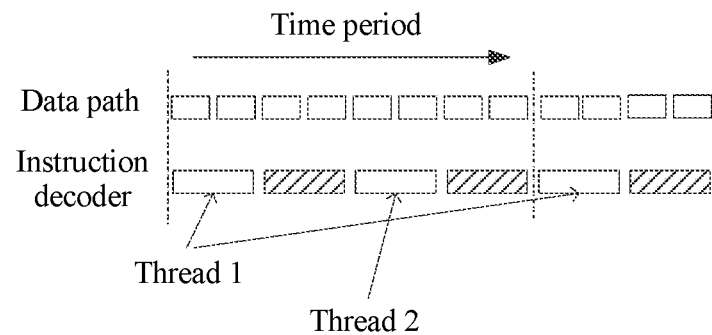
FIG. 14A is a schematic diagram of another instruction scheduling process in a hybrid mode.

For example, X=8 and Z=2. If it is assumed that the clock rate of the decoding unit 31 is ½ of the clock rate of the processing unit 32, an instruction scheduling process of the decoding unit 31 is shown in FIG. 14A. The instruction scheduling process shown in FIG. 14A may be considered as the hybrid mode.

Optionally, the clock rate of the decoding unit 31 is $Z/X$ of the clock rate of the processing unit 32. In other words, the clock rate of the instruction decoder 311 is $Z/X$ of the clock rate of the data path 321. In this case, a minimum value is assigned to the clock rate of the decoding unit 31 (or the instruction decoder 311), and power consumption of the decoding unit 31 is minimized.

Figure 14B:
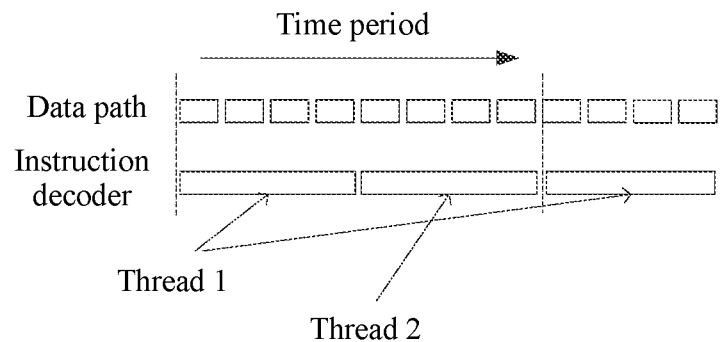
FIG. 14B is a schematic diagram of another instruction scheduling process in a TLP mode.

For example, X=8 and Z=2. If it is assumed that the clock rate of the decoding unit 31 is ¼ of the clock rate of the processing unit 32; in other words, the clock rate of the instruction decoder 311 is ¼ of the clock rate of the data path 321, an instruction scheduling process of the decoding unit 31 is shown in FIG. 14B. The instruction scheduling process shown in FIG. 14B may be considered as the TLP mode.

In the processor provided in this embodiment of this application, the clock rate of the decoding unit is configured to be lower than the clock rate of the processing unit in order to reduce power consumption of the processor.

Optionally, in this embodiment of this application, the clock rate of the decoding unit 31 is allowed to be lower than the clock rate of the processing unit 32. In other words, the clock rate of the instruction decoder 311 is lower than the clock rate of the data path 321. In addition, q×Z processing units 32 may be configured, and q is a positive integer. For the Z threads executed by the processor 30, q processing units 32 are configured for each thread to execute an instruction in the thread. For this configuration, an additional cache is required to store a decoding result, but because instructions in a same thread are executed by a same processing unit 32; in other words, data transfer in a thread may be implemented in a manner of transferring data between pipeline segments in the processing unit 32 in order to simplify implementation overheads of data transfer.

Figure 15A:
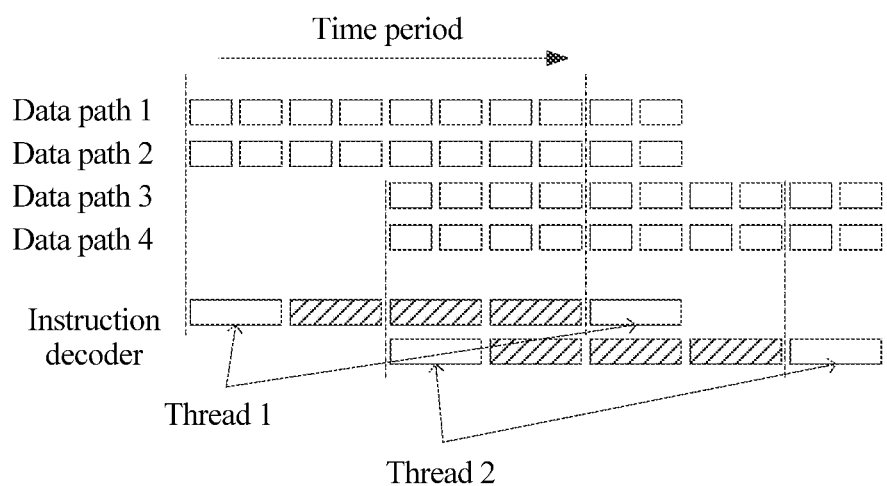
FIG. 15A is a schematic diagram of another instruction scheduling and execution process in a hybrid mode.
Figure 15B:
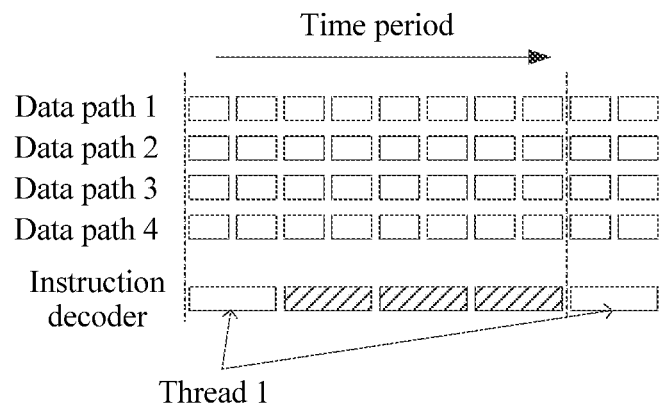
FIG. 15B is a schematic diagram of another instruction scheduling and execution process in a DLP mode.
Figure 15C:
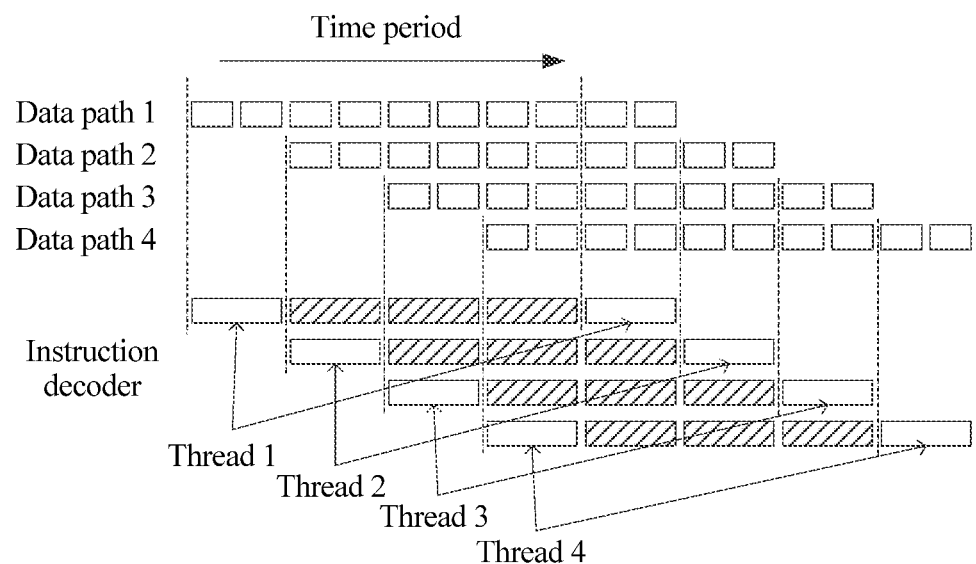
FIG. 15C is a schematic diagram of another instruction scheduling and execution process in a TLP mode.

In an example, it is assumed that the clock rate of the decoding unit 31 is ½ of the clock rate of the processing unit 32; in other words, the clock rate of the instruction decoder 311 is ½ of the clock rate of the data path 321. For example, X=8. When the clock rate of the instruction decoder 311 is ½ of the clock rate of the data path 321, the maximum quantity of threads supported by the processor 30 is 8×½=4. In the hybrid mode, for example, Z=2, and two processing units 32 are configured for each thread to execute an instruction in the thread. A corresponding instruction scheduling and execution process is shown in FIG. 15A. In the DLP mode, for example, Z=1, and four processing units 32 are configured for each thread to execute an instruction in the thread. A corresponding instruction scheduling and execution process is shown in FIG. 15B. In the TLP mode, for example, Z=4, and one processing unit 32 is configured for each thread to execute an instruction in the thread. A corresponding instruction scheduling and execution process is shown in FIG. 15C.

An embodiment of this application further provides an instruction scheduling method, and the method may be applied to the decoding unit of the processor provided in the foregoing embodiment. The method may include the following steps.

The decoding unit obtains one instruction from each of Z predefined threads in each cyclic period, decodes the Z obtained instructions to obtain Z decoding results, and sends the Z decoding results to a processing unit.

Each cyclic period includes X sending periods, one decoding result is sent to the processing unit in each sending period, a decoding result of the Z decoding results may be repeatedly sent by the decoding unit in a plurality of sending periods, $1 \leq Z < X$ or $Z = X$, and Z is an integer.

Optionally, the decoding unit includes an instruction decoder and X program counters. The decoding unit may schedule an instruction according to the three instruction scheduling modes described above.

For details not disclosed in the method embodiment in this application, refer to the embodiment of the processor in this application.

In conclusion, according to the technical solution provided in this embodiment of this application, when a quantity of threads executed by the processor is less than a maximum quantity of threads supported by the processor, the decoding unit repeatedly sends the decoding result to the processing unit in the plurality of sending periods such that the decoding unit sends one decoding result to the processing unit in each sending period. Therefore, there is no idle time period in which no instruction is executed in the processing unit such that the processing unit is fully utilized, high utilization of the processing unit is ensured, and performance of the processing unit can be fully utilized.

It should be additionally noted that the processor provided in the embodiment of this application may be applied to any electronic device having a computing processing requirement. For example, the electronic device may be a personal computer (Personal Computer, PC), a mobile phone, a tablet computer, an e-book reader, a multimedia playback device, a wearable device, a server, or a network communications device.

It should be understood that "a plurality of" refers to two or more than two in this specification. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. An apparatus for X-channel interleaved multi-threading (IMT), wherein X is an integer greater than one, and wherein the apparatus comprises:
    a decoder configured to:
        obtain Z instructions, wherein the Z instructions comprise an instruction from each predefined thread of Z predefined threads in each cyclic period, wherein Z is an integer;
        decode the Z instructions to obtain Z decoding results, and
        send the Z decoding results, wherein each of the cyclic periods comprises X sending periods, wherein one of the Z decoding results is sent in each of the X sending periods, wherein the Z decoding results are repeatedly sent in multiple sending periods, wherein ($1 \leq Z < X$ or $Z = X$); and
    a processor coupled to the decoder and configured to:
        receive the Z decoding results; and
        execute the Z instructions based on the Z decoding results, wherein the processor comprises a data path and X groups of data registers, and wherein the data path is configured to:
            read, according to an address code in the decoding result, an operand from a data register that is in an ith group of the X groups and that corresponds to the address code when a decoding result is sent by the decoder in an ith sending period of the cyclic periods, wherein $1 \leq i \leq X$, and wherein the i is an integer; and
            perform an operation on the operand based on an operation code in the decoding result.

2. The apparatus of claim 1, wherein the decoder comprises an instruction decoder configured to:
    assign k=1;
    determine a value of a jth program counter in an ith sending period, wherein the ith sending period is in an nth cyclic period;
    obtain an instruction from a jth thread of the Z predefined threads based on the value of the jth program counter, wherein an initial value of each of the n, the i, and the j is one, and wherein X is an integer multiple of the Z;
    update the value of the jth program counter;
    decode the instruction to obtain a decoding result;
    send the decoding result to the processor;
    assign i=i+1;
    determine whether the i is greater than the X; and
    assign k=k+1 when the i is less than or equal to the X.

3. The apparatus of claim 1, wherein the decoder comprises an instruction decoder configured to:
    determine a value of a jth program counter in an ith sending period, wherein the ith sending period is of an nth cyclic period;
    obtain an instruction from a jth thread of the Z predefined threads based on the value of the jth program counter, wherein an initial value of each of the n, the i, and the j is one, and wherein the X is an integer multiple of the Z;
    update the value of the jth program counter;
    decode the instruction to obtain a decoding result;
    send the decoding result to the processor;
    assign i=i+1;
    compare a value of the i with a value of each of the X and the Z; and
    when the i is less than or equal to the Z:
        assign j=j+1; and
        re-perform the process starting from the step of obtaining one instruction from a jth thread of the Z predefined threads based on a value of a jth program counter in an ith sending period of an nth cyclic period;
    when the i is greater than the Z and is less than or equal to the X:
        assign the j to a remainder obtained after the i is divided by the Z; and
        re-perform the process starting from the step of sending the decoding result corresponding to the instruction in the jth thread to the processor; or when the i is greater than the X:
assign n=n+1, the i=1, and the j=1, and re-perform the process starting from the step of obtaining one instruction from a jth thread of the Z predefined threads based on a value of a jth program counter in an ith sending period of an nth cyclic period.

4. The apparatus of claim 1, further comprising a Z register configured to store a value of the Z.

5. The apparatus of claim 1, wherein the processor comprises a mode register configured to indicate an instruction scheduling mode to the decoder, wherein the instruction scheduling mode comprises either (1) a thread level parallelism (TLP) mode and a data level parallelism (DLP) mode, or (2) the TLP mode, the DLP mode and a hybrid mode, wherein the decoder comprises the TLP mode when the Z=the X, wherein the decoder comprises the DLP mode when the Z=1, and wherein the decoder comprises the hybrid mode when 1<the Z<the X.

6. The apparatus of claim 1, further comprising additional processors.

7. The apparatus of claim 1, wherein the decoder comprises a first clock rate and the processor comprises a second clock rate, and wherein the first clock rate is lower than the second clock rate.

8. The apparatus of claim 2, wherein when the k is less than or equal to the X/Z, the instruction decoder is further configured to:
send the decoding result to the processor;
assign the i=i+1;
determine whether the i is greater than the X; and
when the i is less than or equal to the X, assign k=k+1.

9. The apparatus of claim 2, wherein when the k is greater than the X/Z, the instruction decoder is further configured to:
assign j=j+1 and the k=1;
obtain another instruction from the jth thread of the Z predefined threads based on the value of the jth program counter, wherein the initial value of each of the n, the i, and the j is one, and wherein the X is an integer multiple of the Z;
update the value of the jth program counter;
decode the instruction to obtain a decoding result;
send the decoding result to the processor;
assign i=i+1;
determine whether the i is greater than the X; and
when the i is less than or equal to the X, assign k=k+1.

10. The apparatus of claim 1, wherein the decoder comprises an instruction decoder configured to:
assign k=1;
determine a value of a jth program counter in an ith sending period, wherein the ith sending period is in an nth cyclic period;
obtain an instruction from a jth thread of the Z predefined threads based on the value of the jth program counter, wherein an initial value of each of the n, the i, and the j is one, and wherein the X is an integer multiple of the Z;
update the value of the jth program counter;
decode the instruction to obtain a decoding result;
send the decoding result to the processor;
assign i=i+1;
determine whether the i is greater than the X;
when the i is greater than the X, perform the following steps:
assign n=n+1, the I=1, the j=1 and the k=1;
obtain another instruction from the jth thread of the Z predefined threads based on the value of the jth program counter, wherein an initial value of each of the n, the i, and the j is one, and wherein the X is an integer multiple of the Z;
update the value of the jth program counter;
decode the instruction to obtain a decoding result;
send the decoding result to the processor; and
assign the i=i+1.

11. The apparatus of claim 2, wherein the decoder comprises an instruction decoder, and wherein when the i is greater than the Z and is less than or equal to the X, the instruction decoder is configured to:
assign a jth program counter to a remainder obtained after the i is divided by the Z;
send the decoding result to the processor; and
assign the i=i+1.

12. An instruction scheduling method for X-channel interleaved multi-threading (IMT), implemented by a decoder in a processor, wherein X is an integer greater than one, and wherein the instruction scheduling method comprises:
obtaining Z instructions, wherein the Z instructions comprise an instruction from each predefined thread of Z predefined threads in each cyclic period, wherein Z is an integer;
decoding the Z instructions to obtain Z decoding results; and
sending the Z decoding results to the processor, wherein each of the cyclic periods comprises X sending periods, wherein one of the Z decoding results is sent in each of the X sending periods, wherein the Z decoding results is repeatedly sent in multiple sending periods, and wherein $1 \le Z < X$ or $Z=X$, wherein the processor comprises a data path and X groups of data registers, and wherein the processor is configured to:
read, according to an address code in the decoding result, an operand from a data register that is in an ith group of the X groups and that corresponds to the address code when a decoding result is sent by the decoder in an ith sending period of the cyclic periods, wherein $1 \le i \le X$, and wherein the i is an integer; and
perform an operation on the operand based on an operation code in the decoding result.

13. The instruction scheduling method of claim 12, wherein the decoder comprises an instruction decoder and X program counters, and wherein the method comprises:
assigning k=1;
determining a value of a jth program counter in an ith sending period, wherein the ith sending period is in an nth cyclic period;
obtaining an instruction from a jth thread of the Z predefined threads based on the value of the jth program counter, wherein an initial value of each of the n, the i, and the j is one, and wherein the X is an integer multiple of the Z;
updating the value of the jth program counter;
decoding the instruction to obtain a decoding result;
sending the decoding result to the processor;
assigning i=i+1;
determining whether the i is greater than the X; and
assigning k=k+1 based on the i being less than or equal to the X.

14. The instruction scheduling method of claim 12, wherein the decoder comprises an instruction decoder and X program counters, and wherein the method further comprises:

determining a value of a jth program counter in an ith sending period, wherein the ith sending period is of an nth cyclic period;

obtaining, by the instruction decoder, an instruction from a jth thread of the Z predefined threads based on the value of a jth program counter, wherein an initial value of each of the n, the i, and the j is one, and wherein the X is an integer multiple of the Z;

updating, by the instruction decoder, the value of the jth program counter decoding the instruction to obtain a decoding result;

sending, by the instruction decoder, the decoding result to the processor; and assigning i=i+1.

15. The instruction scheduling method of claim 12, wherein the decoder comprises an instruction decoder and X program counters, and wherein the method comprises:

assigning k=1;

determining a value of a jth program counter in an ith sending period, wherein the ith sending period is in an nth cyclic period;

obtaining an instruction from a jth thread of the Z predefined threads based on the value of the jth program counter, wherein an initial value of each of the n, the i, and the j is one, and wherein the X is an integer multiple of the Z;

updating the value of the jth program counter;

decoding the instruction to obtain a decoding result;

sending the decoding result to the processor;

assigning i=i+1;

determining whether the i is greater than the X;

when the i is greater than the X, assigning the n=n+1, the i=1, the j=1, and the k=1;

obtaining another instruction from the jth thread of the Z predefined threads based on the value of the jth program counter;

updating the value of the jth program counter;

decoding the other instruction to obtain a decoding result;

sending the decoding result to the processor;

assigning the i=i+1;

determining whether the i is greater than the X; and assigning the k=k+1.

16. The instruction scheduling method of claim 13, wherein when the k is less than or equal to X/Z, the instruction scheduling method further comprises:

sending the decoding result to the processor;

assigning the i=i+1;

determining whether the i is greater than the X; and when the i is less than or equal to the X, assigning k=k+1.

17. The instruction scheduling method of claim 13, wherein when the k is greater than the X/Z, the instruction scheduling method further comprises:

assigning the j=j+1 and the k=1;

obtaining another instruction from the jth thread of the Z predefined threads based on the value of the jth program counter;

updating the value of the jth program counter;

decoding the other instruction to obtain a decoding result;

sending the decoding result to the processor;

assigning the i=i+1;

determining whether the i is greater than the X; and when the i is less than or equal to the X, assigning the k=k+1.

18. The instruction scheduling method of claim 14, wherein when the i is less than or equal to the Z, the instruction scheduling method further comprises:

assigning the j=j+1;

obtaining, by the instruction decoder, another instruction from the jth thread of the Z predefined threads based on the value of a jth program counter, wherein an initial value of each of the n, the i, and the j is one, and wherein the X is an integer multiple of the Z;

updating, by the instruction decoder, the value of the jth program counter decoding the instruction to obtain a decoding result;

sending, by the instruction decoder, the decoding result to the processor; and assigning the i=i+1.

19. The instruction scheduling method of claim 14, wherein when the i is greater than the Z and is less than or equal to the X, the instruction scheduling method further comprises:

assigning the j to a remainder obtained after the i is divided by the Z;

sending, by the instruction decoder, the decoding result to the processor; and assigning the i=i+1.

20. The instruction scheduling method of claim 14, wherein when the i is greater than the X, the instruction scheduling method further comprises:

assigning n=n+1, the i=1, and the j=1;

obtaining, by the instruction decoder, another instruction from the jth thread of the Z predefined threads based on the value of a jth program counter, wherein an initial value of each of the n, the i, and the j is one, and wherein the X is an integer multiple of the Z;

updating, by the instruction decoder, the value of the jth program counter;

decoding the instruction to obtain a decoding result;

sending, by the instruction decoder, the decoding result to the processor; and assigning the i=i+1.

* * * * *